No. 757,995. Patented April 19, 1904.

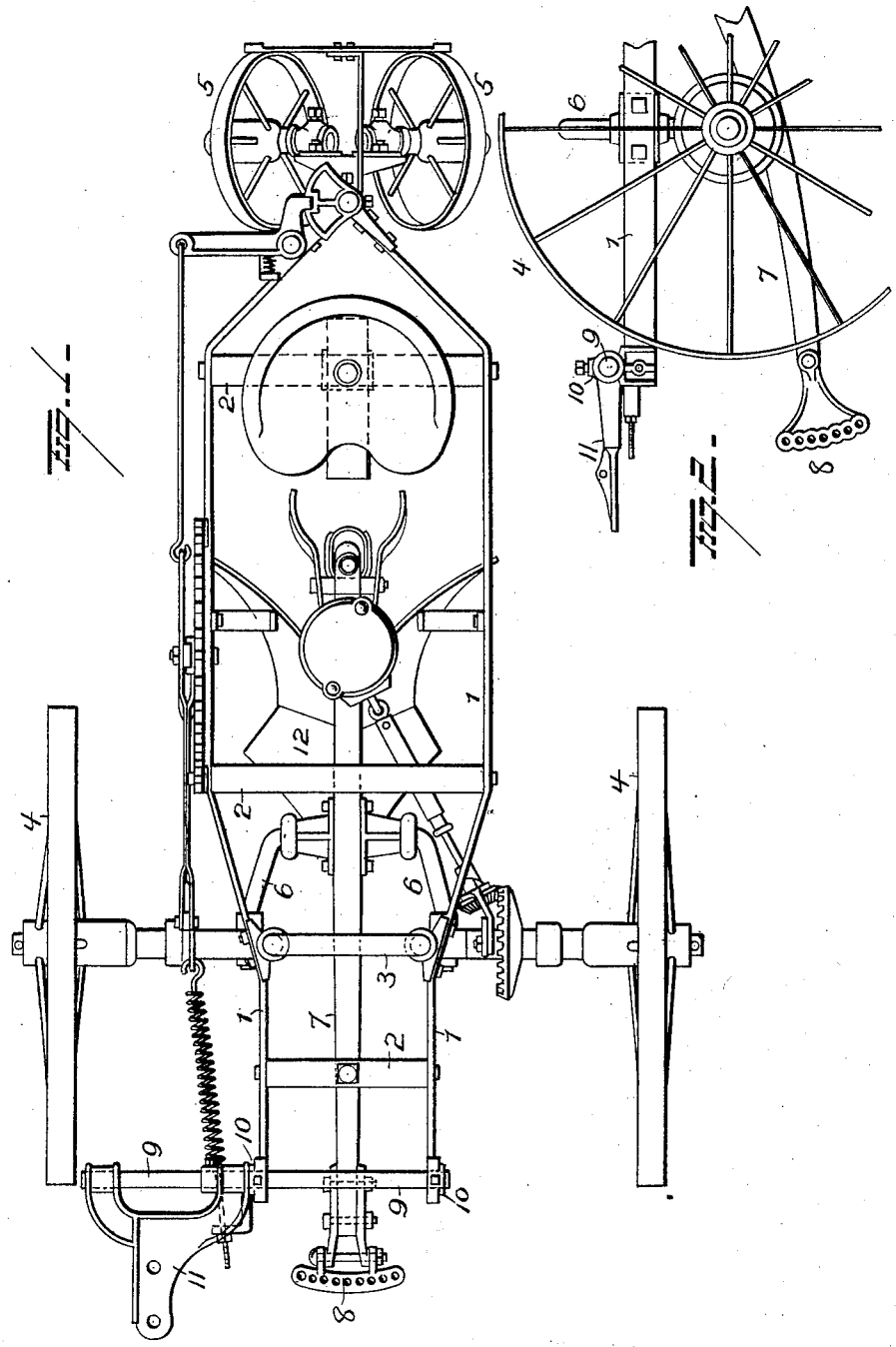

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

DRAFT DEVICE.

SPECIFICATION forming part of Letters Patent No. 757,995, dated April 19, 1904.

Original application filed April 9, 1903, Serial No. 151,831. Divided and this application filed January 20, 1904. Serial No. 189,859.

(No model.)

*To all whom it may concern:*

Be it known that I, CALVIN R. DAVIS, a resident of South Bend, in the county of St. Joseph and State of Indiana, have invented certain new and useful Improvements in Draft Devices; and I do hereby declare the following to be a full, clear, and exact description of the invention, such as will enable others skilled in the art to which it appertains to make and use the same.

My invention relates to improved draft devices, and more particularly to improvements of this character employed on sulky listers, plows, planters, and the like, this application being a division of application for patent filed by me April 9, 1903, Serial No. 151,831.

The object of the present invention is to provide improvements of this character to equalize the draft when three, four, or more draft-animals are employed; and it consists in certain novel features of construction and combinations and arrangements of parts, as will be more fully hereinafter described, and pointed out in the claims.

In the accompanying drawings, Figure 1 is a plan view of a lister-frame, showing my improvements thereon; and Fig. 2 is a fragmentary view in side elevation.

1 represents a frame comprising two longitudinal bars bowed outward between their ends and connected at intermediate points by arched cross-bars 2, three of which latter being shown. The frame is supported near its forward end upon an axle 3 and wheels 4 thereon and at its rear end by caster-wheels 5. A yoke 6 is supported at its ends in bearings on axle 3 and has rotary connection between its ends with the beam 7 of a lister 12, the forward end of the beam projecting to or beyond the end of frame 1 and having a clevis 8 thereon for the attachment of two draft-animals.

A cross-rod 9 is secured in bearings 10, bolted to the forward ends of the frame-bars 1, and projects at one side beyond the frame. A pole-plate 11 is carried by said rod 9, and when three draft-animals are employed the pole-plate 11 is supported on rod 9 at one side of frame 1; but when four animals are used the pole-plate is secured on rod 9 between the side bars of frame 1, so that the pole will extend between the two teams.

Slight changes might be made in the general form and arrangement of the parts described without departing from my invention. Hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination of a frame having its side bars spaced apart at its forward end, wheels supporting said frame, a rod extending across the forward end of the frame from one side bar to the other and projecting laterally beyond one of said side bars, and a removable pole-plate adapted for attachment to said cross-rod between the parallel bars of the frame or to the laterally-projecting portion of said cross-rod.

2. In a sulky-lister, the combination with a frame having an open forward end, wheels supporting the same, and a lister carried by said frame, of a clevis attached to the lister below the open forward end of the frame, a cross-rod extending across the open forward end of the frame and projecting laterally therefrom, and a removable pole-plate attachable to said rod either to one side of the frame or at the center thereof.

In testimony whereof I have signed this specification in the presence of two subscribing witnesses.

CALVIN R. DAVIS.

Witnesses:
EDWIN NICAR,
F. C. NIPPOLD.